(12) United States Patent
Zhang et al.

(10) Patent No.: US 12,129,597 B2
(45) Date of Patent: Oct. 29, 2024

(54) SYNTHETIC LEATHER ARTICLE AND METHOD FOR PREPARING SAME

(71) Applicant: Dow Global Technologies LLC, Midland, MI (US)

(72) Inventors: Chao Zhang, Shanghai (CN); Zetian Cai, Shanghai (CN); Huan Chen, Beijing (CN); Yi Zhang, Shanghai (CN); Xiangyang Tai, Shanghai (CN); Shihao Qin, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 722 days.

(21) Appl. No.: 17/285,007

(22) PCT Filed: Nov. 15, 2018

(86) PCT No.: PCT/CN2018/115576
§ 371 (c)(1),
(2) Date: Apr. 13, 2021

(87) PCT Pub. No.: WO2020/097838
PCT Pub. Date: May 22, 2020

(65) Prior Publication Data
US 2021/0388559 A1    Dec. 16, 2021

(51) Int. Cl.
*D06N 3/14* (2006.01)
*D06N 3/00* (2006.01)

(52) U.S. Cl.
CPC ........... *D06N 3/145* (2013.01); *D06N 3/0002* (2013.01); *D06N 3/005* (2013.01); *D06N 2211/28* (2013.01)

(58) Field of Classification Search
None
See application file for complete search history.

(56) References Cited

U.S. PATENT DOCUMENTS

2010/0310882 A1  12/2010  Ogawa et al.
2016/0298291 A1  10/2016  Yoshida

FOREIGN PATENT DOCUMENTS

| CN | 102444030 B | 10/2013 |
|---|---|---|
| CN | 104448233 | 3/2015 |
| CN | 104088161 B | 5/2016 |
| CN | 105970640 | 9/2016 |
| CN | 106008891 | 10/2016 |
| CN | 106012574 | 10/2016 |
| CN | 103483529 B | 12/2016 |
| CN | 106638008 | 5/2017 |
| CN | 107602801 | 1/2018 |
| CN | 107629670 | 1/2018 |

(Continued)

OTHER PUBLICATIONS

PCT/CN2018/115576, International Search Report and Written Opinion with a mailing date of Jul. 22, 2019.

(Continued)

*Primary Examiner* — Shawn Mckinnon

(57) ABSTRACT

A synthetic leather article comprising a top coating derived from an internally emulsified PUD, a barrier layer derived from an externally emulsified PUD and a 2K non-solvent PU foam layer is provided. The leather article exhibits high delamination resistance while retaining superior mechanical properties and appearance comparable with those derived from the organic solvent-based PU. A method for preparing the synthetic leather article is also provided.

11 Claims, 1 Drawing Sheet

(56) References Cited

FOREIGN PATENT DOCUMENTS

| | | |
|---|---|---|
| CN | 108017770 | 5/2018 |
| WO | 2005085311 | 9/2005 |
| WO | 2013040765 | 3/2013 |
| WO | 2014059596 | 4/2014 |
| WO | 2014107878 | 7/2014 |

OTHER PUBLICATIONS

PCT/CN2018/115576, International Preliminary Report on Patentability with a mailing date of May 18, 2021.

SYNTHETIC LEATHER ARTICLE AND METHOD FOR PREPARING SAME

FIELD OF THE INVENTION

The present disclosure relates to a synthetic leather article and a method for preparing the same, in particular a 2K non-solvent polyurethane based multi-layer synthetic leather article and a method for preparing the same.

INTRODUCTION

Polyurethane (PU) synthetic leathers generally comprise a fabric, a PU topcoating/skin layer and a PU foam (also known as a poromeric layer) sandwiched between the fabric and the skin layer. The foam mainly contributes to softness and hand-feel of the PU synthetic leather. The skin layer can provide additional features including patterns, color, gloss, and abrasion resistance.

Currently, most PU synthetic leathers are made using volatile organic solvents such as dimethylformamide (DMF), methylethyl ketone (MEK) and toluene. These solvent-based systems are less environmentally friendly and less healthy than aqueous systems. Therefore, aqueous systems are more desirable. Attempts have been made to minimize the use of volatile organic solvents in the manufacturing of PU synthetic leather. There are several new Ecologically Friendly (ECO) technologies in this market, such as 2K non-solvent PU foam technology, PUD (polyurethane dispersion) foam technology and TPU foam technology. 2K non-solvent PU foam is one of the most popular technologies, for its lowest cost and flexible formulation. However, this technology also has weak points. For example, all the attempts to cover the 2K non-solvent PU foam layer with a coating layer prepared by an aqueous PUD comprising PU particles emulsified with internal emulsifiers, which is a well-known green technology, has failed due to the poor adhesion strength between the top coating and the 2K non-solvent PU foam. Particularly, 2K non-solvent PU foam is formed by coating the raw materials for the PU foam, such as isocyanate components and isocyanate-reactive components, onto the coating layer, followed by performing polyurethane reaction and simultaneously foaming the resultant polyurethane so as to form the formed PU resin. The additives in traditional internally emulsified PUD, which refers to PUD emulsified by surfactant groups, particularly ionic surfactant groups covalently attached to the backbone chain of the polyurethane, can interfere with the polyurethane curing reaction of the 2K PU, hence the final 2K PU foam can't be easily cured on the traditional internally emulsified PUD coating layer. The previous research failed to find any effective means for achieving acceptable compatibility between the internally emulsified PUD and 2K non-solvent PU form. Besides, the externally emulsified PUD, which refers to PUD mainly emulsified by surfactants that are not covalently attached to the backbone chain of the polyurethane, have hitherto been known as a candidate material for preparing the PU matrix, and there has been no report about using the externally emulsified PUD for the adhesion-promoting layer between the internally emulsified PUD and 2K non-solvent PU form.

Therefore, it is desirable to provide a novel technology in which the 2K PU foam layer is rendered compatible with the traditional PUD layer while the superior mechanical properties and appearance comparable with those derived from the organic solvent-based PU can still be achieved.

SUMMARY OF THE INVENTION

The present disclosure provides a novel synthetic leather article with superior peeling strength.

In a first aspect of the present disclosure, the present disclosure provides a synthetic leather article, comprising, from top to bottom:

(A) a top coating layer derived from an internally emulsified polyurethane dispersion comprising a first polyurethane derived from (Ai) one or more first isocyanate components comprising at least two isocyanate groups, (Aii) one or more first isocyanate-reactive components comprising at least two isocyanate-reactive groups, and (Aiii) one or more internal emulsifiers, wherein the internal emulsifiers or the residual moieties thereof are covalently attached to the backbone chain of the first polyurethane;

(B) a barrier layer derived from an externally emulsified polyurethane dispersion, wherein the externally emulsified polyurethane dispersion comprising one or more external emulsifiers and a second polyurethane derived from (Bi) one or more second isocyanate components comprising at least two isocyanate groups and (Bii) one or more second isocyanate-reactive components comprising at least two isocyanate-reactive groups, wherein the external emulsifiers or the residual moieties of the external dispersants are not covalently attached to the backbone chain of the second polyurethane, (C) a polyurethane foam layer comprising a third foamed polyurethane derived from a solvent-free system comprising (Ci) one or more third isocyanate components comprising at least two isocyanate groups, (Cii) one or more third isocyanate-reactive components comprising at least two isocyanate-reactive groups, and (Ciii) one or more foaming agents; and (D) a backing substrate.

In a second aspect of the present disclosure, the present disclosure provides a method for producing the synthetic leather article of the first aspect, comprising:

(1) providing the internally emulsified polyurethane dispersion comprising particles of the first polyurethane and applying the internally emulsified polyurethane dispersion onto a release layer so as to form the top coating layer on the release layer;

(2) providing the externally emulsified polyurethane dispersion comprising particles of the second polyurethane and applying the externally emulsified polyurethane dispersion onto the opposite side of the top coating layer from the release layer so as to form the barrier layer on the top coating layer;

(3) applying the solvent-free system onto the opposite side of the barrier layer from the top coating, curing and foaming the solvent-free system to form viscous polyurethane foam layer on the barrier layer;

(4) applying the backing substrate onto the opposite side of the polyurethane foam layer from the barrier layer, then heating to conduct fully curing of the polyurethane foam layer; and (5) optionally, removing the release layer. In a third aspect of the present disclosure, the present disclosure provides the use of an externally emulsified polyurethane dispersion as adhesion promoting layer between the a top coating derived from an internally emulsified polyurethane dispersion and the 2K non-solvent PU foam.

According to a preferable embodiment of the first to the third aspects, the internally emulsified polyurethane dispersion is prepared without the assistance of external emulsifier, and the externally emulsified polyurethane dispersion does not comprise any cationic or anionic hydrophilic pendant group or a group which can be converted into the cationic or anionic hydrophilic pendant group covalently attached to the backbone chain of the second polyurethane.

The synthetic leather article disclosed herein exhibits superior delamination resistance and is useful as synthetic leather in applications such as automotive, footwear, textiles, garment, furniture, etc.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, the term "composition", "formulation" or "mixture" refers to a physical blend of different components, which is obtained by mixing simply different components by a physical means.

As disclosed herein, "and/or" means "and, or as an alternative". All ranges include endpoints unless otherwise indicated.

As disclosed herein, adhesion strength or peeling strength of a multilayer structure refers to interlayer adhesion strength or peeling strength between any two adjacent layers of the multilayer structure.

Figure 1:
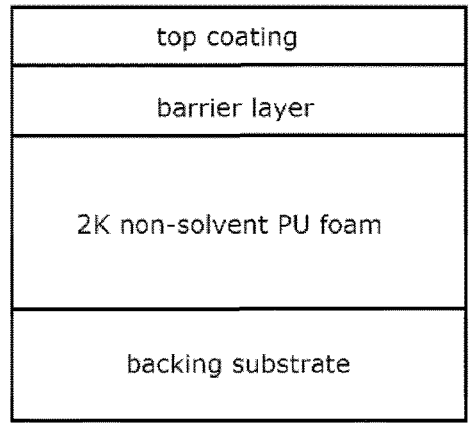
FIG. 1 is a schematic illustration of a cross-section of one embodiment of a synthetic leather article described herein.

FIG. 1 is a schematic illustration of a cross-section of one embodiment of a synthetic leather article described herein. In this embodiment of the present disclosure, the synthetic leather article comprises, from top to bottom, a top coating layer formed by an internally emulsified polyurethane dispersion (internally emulsified PUD), a barrier layer formed by an externally emulsified polyurethane dispersion (externally emulsified PUD), a 2K non-solvent PU foam layer, and a backing substrate (e.g. a fabric). Please note that the leather articles in all the figures are not necessarily shown in actual proportion, and the dimensions of one or more layers may be exaggerated so as to clearly show the configuration thereof.

The method for preparing the synthetic leather article described herein mainly comprises the steps of:
  providing a first dispersion comprising particles of the internally emulsified polyurethane, applying the first dispersion onto a release layer, and heating/drying the coating of the first dispersion so as to form the top coating on the release layer;
  providing a second externally emulsified dispersion comprising particles of a polyurethane which is prepared without using any ionic internally emulsifier, applying the second dispersion onto the opposite side of the top coating from the release layer, and heating/drying the coating of the second dispersion so as to form the barrier layer on the top coating;
  applying the two part raw materials for the 2K non-solvent PU foam onto the opposite side of the barrier layer from the top coating, subsequently curing and foaming the two part raw materials system so as to form the polyurethane foam on the barrier layer;
  applying the back substrate onto the opposite side of the polyurethane foam layer from the barrier layer, heating for fully curing; and
  optionally, removing the release layer.

Release Layer

Suitable release layers are typically known in the prior art as "release paper". Examples of suitable release layers include foils of metal, plastic or paper. In one preferred embodiment of the present disclosure, the release layer is a paper layer optionally coated with a plastic membrane. Preferably, the paper layer disclosed herein is coated with a polyolefin, more preferably polypropylene. Alternatively, the paper layer is preferably coated with silicone. In an alternative embodiment, the release layer used herein is a PET layer optionally coated with plastic membrane. Preferably, the PET layer can be is coated with a polyolefin, more preferably polypropylene. Alternatively, the PET layer is preferably coated with silicone. Examples of suitable release layers are commercially available. Examples of renowned manufacturers in the prior art include Binda (Italy), Arjo Wiggins (UK/USA) and Lintec (Japan). The release layers used in the present disclosure may have a flat, embossed or patterned surface so that corresponding or complementary surface profile can be formed on the outermost surface of the synthetic leather article. Preferably, the release layer is textured in the mode of leather grain so as to impart the synthetic leather article with good haptic property comparable with that of high grade natural leather. The release layer generally has a thickness of 0.001 mm to 10 mm, preferably from 0.01 mm to 5 mm, and more preferably from 0.1 mm to 2 mm.

The material and the thickness of the release layer can be properly adjusted, as long as the release layer is able to endure the chemical reaction, mechanical processing and thermal treatments experienced during the manufacturing procedures and can be readily peeled from the resultant synthetic leather without bringing about the delamination between the top layer and the foam layer.

Internally Emulsified Polyurethane Dispersion

The top coating is formed by applying an internally emulsified polyurethane dispersion on the release layer to a wet thickness of e.g. from 1 μm to 1000 μm, preferably from 1 μm to 500 μm, more preferably from 20 μm to 200 μm, and most preferably from 100 μm to 150 μm, followed by removing the solvent from the dispersion by e.g. thermal treatment or evaporation under decreased pressure, hence the top coating is basically formed by the polyurethane particles dispersed in the dispersion together with any residual nonvolatile additives. According to one preferable embodiment, the internally emulsified polyurethane dispersion is aqueous. Generally, the aqueous dispersion has at most about 1 percent by weight of the total weight of the dispersion of organic solvent. Preferably, the aqueous dispersion has at most about 2000 parts per million by weight (ppm), more preferably at most about 1000 ppm, even more preferably at most about 500 ppm and most preferably at most a trace amount of organic solvent.

"Internally emulsified polyurethane dispersion" as described herein refers to a polyurethane dispersion that is emulsified through the covalently attachment of ionic pendant groups (residual moiety of ionic internal emulsifier) to the backbone chain within the polyurethane particles dispersed in the liquid medium. Internally emulsified polyurethane dispersions are well known and can be prepared by polymerizing of (Ai) one or more first isocyanate components, (Aii) one or more first isocyanate-reactive components, and (Aiii) one or more internal emulsifiers (emulsifier). The resultant polyurethane particles exhibit self-dispersibility derived from the incorporation of ionic hydrophilic groups and are stably dispersed in the solvent, preferably water, at a solid content of from at least 35wt % to less than 60wt %, based on the total weight of the internally emulsified polyurethane dispersion.

The isocyanate component (Ai) includes diisocyanates $X(NCO)_2$, where X is an aliphatic hydrocarbon radical having 4 to 12 carbon atoms, a cycloaliphatic or aromatic hydrocarbon radical having from 6 to 15 carbon atoms or an araliphatic hydrocarbon radical having from 7 to 15 carbon atoms. Examples of such diisocyanates comprise tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl) methane (HMDI) and also mixtures thereof. The mixtures of said isocyanates may include mixtures of the respective structural isomers of diisocyanatotoluene and diisocyanatodiphenylmethane, especially the mixture of 80 mol % of 2,4-diisocyanatotoluene and 20 mol % of 2,6-diisocyanatotoluene, mixtures of aromatic isocyanates such as 2,4-diisocyanatotoluene and/or 2,6-diisocyanatotoluene with aliphatic or cycloaliphatic isocyanates such as hexamethylene diisocyanate and IPDI, the preferred mixing ratio of the aliphatic to aromatic isocyanates being within the range 4:1 to 1:4.

According to one embodiment of the present disclosure, the isocyanate components (Ai) comprise both monomeric and prepolymeric isocyanate components comprising at least two isocyanate groups. The prepolymeric isocyanate components can be obtained by reacting the above stated monomeric isocyanate components with the following isocyanate-reactive components in the presence of the internal emulsifier, with the proviso that the prepolymeric isocyanate components still comprise at least two isocyanate groups. Then the prepolymeric isocyanate components may further react with the isocyanate-reactive components (which is also referred as chain extender) to produce the internally emulsified PUD.

In an embodiment of the present disclosure, the one or more first isocyanate-reactive components (Aii) comprise polyester polyols having a molecular weight from 500 to 5,000, preferably from 1000 to 3,000 g/mol so as to achieve good film formability and elasticity of the top coating layer. The polyester polyols are obtained by reacting of dihydric alcohols with dibasic carboxylic acids or polycarboxylic acids, or anhydrides/esters thereof. The dibasic carboxylic acids or polycarboxylic acids include aliphatic, cycloaliphatic, araliphatic, aromatic or heterocyclic and may be substituted, for example with halogen atoms, and/or may be saturated or unsaturated. Examples of said polycarboxylic acids includes suberic acid, azelaic acid, phthalic acid, isophthalic acid, phthalic anhydride, tetrahydrophthalic anhydride, hexahydrophthalic anhydride, tetrachlorophthalic anhydride, endomethylene-tetrahydrophthalic anhydride, glutaric anhydride, alkenylsuccinic acid, maleic acid, maleic anhydride, fumaric acid, dimeric fatty acids. Preference is given to dicarboxylic acids represented the general formula $HOOC-(CH_2)_y-COOH$, where y is an integer from 1 to 20, preferably an even number from 2 to 20.

In an alternative embodiment of the present disclosure, the one or more first isocyanate-reactive components (Aii) comprise one or more polyhydric alcohols selected from the group consisting of ethylene glycol, 1,2-propanediol, 1,3-propanediol, 1,3-butanediol, 1,4-butenediol, 1,4-butynediol, 1,5-pentanediol, neopentylglycol, bis(hydroxy-methyl) cyclohexanes such as 1,4-bis(hydroxymethyl)cyclohexane, 2-methylpropane-1,3-diol, methylpentanediols, also diethylene glycol, triethylene glycol, tetraethylene glycol, polyethylene glycol, dipropylene glycol, polypropylene glycol, dibutylene glycol and polybutylene glycols. Preference is given to alcohols represented by the general formula $HO-(CH_2)_x-OH$, where x is an integer from 1 to 20, preferably an even interger from 2 to 20. The polyhydric alcohols can also be used for preparing the polyester polyols as indicated above.

In an alternative embodiment of the present disclosure, the one or more first isocyanate-reactive components (Aii) comprise polycarbonate diols obtainable for example by reacting phosgene with an excess of the low molecular weight alcohols such as the above stated polyhydric alcohols used for preparing the polyester polyols.

In an alternative embodiment of the present disclosure, the one or more first isocyanate-reactive components (Aii) comprise lactone-based polyesterdiols, which are homopolymers or copolymers of lactones, preferably terminal hydroxyl-functional addition products of lactones with suitable difunctional initiator molecules. Preferred lactones are derived from compounds represented by the general formula $HO-(CH_2)_z-COOH$, where z is an integer from 1 to 20 and one hydrogen atom of a methylene unit may also be replaced by a $C_1$ to $C_4$ alkyl radical. Exemplary lactone-based polyesterdiols include ε-caprolactone, β-propiolactone, γ-butyrolactone, methyl-ε-caprolactone or mixtures thereof.

In an alternative embodiment of the present disclosure, the one or more first isocyanate-reactive components (Aii) include polyetherdiols which are prepared by homopolymerization of ethylene oxide, propylene oxide, butylene oxide, tetrahydrofuran, styrene oxide or epichlorohydrin, in the presence of catalyst, e.g. $BF_3$. Particular preference is given to polytetrahydrofuran having a molecular weight from 240 to 5,000, especially from 500 to 4,500. According to one embodiment of the present disclosure, the one or more internal emulsifiers (Aiii) is a copolymerizable comonomer comprising at least one isocyanate groups or isocyanate-reactive groups and at least one ionic hydrophilic groups or at least one groups which can be converted into an ionic hydrophilic group. The expression "hydrophilic groups or potentially hydrophilic groups" is abbreviated to "(potentially) hydrophilic groups" hereinafter. The (potentially) hydrophilic groups react with the isocyanates components (Ai) or isocyanate-reactive components (Aii) at a significantly slower rate than that of the isocyanate groups or isocyanate-reactive groups contained in the internal emulsifiers (Aiii).

The content of the internal emulsifiers (Aiii) can be properly selected so that the molar content the (potentially) hydrophilic groups is from 30 to 1,000, preferably from 50 to 500, particularly preferably from 80 to 300, mmol/kg, based on the total weight of the components Ai) to Aiii).

The (potentially) hydrophilic groups can be ionic or (potentially) ionic hydrophilic groups. In an embodiment of the present disclosure, the ionic hydrophilic groups comprise anionic groups such as sulfonate, carboxylate and phosphate in the form of their alkali metal or ammonium salts and also cationic groups such as ammonium groups, especially protonated tertiary amino groups or quaternary ammonium groups. Potentially ionic hydrophilic groups comprise those which can be converted by simple neutralization, hydrolysis or quaternization reactions into the above mentioned ionic hydrophilic groups, for example carboxylic acid groups, anhydride groups or tertiary amino groups.

In a preferable embodiment of the present disclosure, (potentially) cationic internal emulsifiers comprise copolymerizable monomers having tertiary amino groups, for example: tris(hydroxyalkyl)amines, N,N'-bis(hydroxyalkyl)-alkylamines, N-hydroxyalkyldialkylamines, tris(aminoalkyl)amines, N,N'-bis(aminoalkyl)alkylamines, N-aminoalkyldialkylamines, wherein the alkyl radicals and alkanediyl units of these tertiary amines independently comprise from 1 to 6 carbon atoms. These tertiary amines are converted into the ammonium salts either with acids, preferably strong mineral acids such as phosphoric acid, sulfuric acid, hydrohalic acids or strong organic acids or by reaction with suitable quaternizing agents such as $C_1$ to $C_6$ alkyl halides or benzyl halides, for example bromides or chlorides.

In a preferable embodiment of the present disclosure, internal emulsifiers (Aiii) having (potentially) anionic groups include aliphatic, cycloaliphatic, araliphatic or aromatic carboxylic acids, carbonic acids and sulfonic acids which bear at least one alcoholic hydroxyl group or at least one primary or secondary amino group. Preference is given to dihydroxyalkylcarboxylic acids having from 3 to 10 carbon atoms, such as dihydroxymethyl propionic acid (DMPA), dimethylolbutanoic acid (DMBA), dihydroxysulfonic acids, dihydroxyphosphonic acids such as 2,3-dihydroxypropanephosphonic acid. If internal emulsifiers (Aiii) having potentially ionic groups are used, they may be converted into the ionic form before, during, but preferably after the isocyanate addition polymerization. The sulfonate or carboxylate groups are particularly preferably present in the form of their salts with an alkali metal ion or an ammonium ion as counterion.

One or more additional copolymerizable monomers other than Ai) to Aiii) may be further included for preparing the internally emulsified PUD. In one embodiment of the present disclosure, one or more crosslinkers may be added. Examples of the crosslinker comprise dihydric nonphenolic alcohols, amines having two or more primary and/or secondary amino groups and compounds simultaneously comprising one or more alcoholic hydroxyl groups and one or more primary and/or secondary amino groups. Particularly, crosslinkers comprise polyfunctional amines having a molecular weight from 32 to 500 g/mol, preferably from 60 to 300 g/mol, and containing at least two amino groups selected from the group consisting of primary and secondary amino groups. Examples of the polyfunctional amine crosslinkers are diamines such as diaminoethane, diamino-propanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexyl-methane, 1,4-diaminocyclohexane, aminoethylethanolamine, hydrazine, hydrazine hydrate or triamines such as diethylene-triamine or 1,8-diamino-4-aminomethyloctane. The content of the above said crosslinkers may be from 1 to 20, preferably from 4 to 15, mol %, based on the total amount of all the isocyanate reactive components. Comonomers having more than two isocyanates groups can be similarly used as the crosslinkers at an amount of 1 to 20, preferably from 4 to 15, mol %, based on the total amount of all the isocyanate components.

The categories and relative amounts of each components are normally chosen so that the overall molar ratio between the isocyanate group and the isocyanate reactive groups is within the range from 0.5:1 to 2:1, preferably within the range from 0.8:1 to 1.5, particularly preferably within the range from 0.9:1 to 1.2:1. The A:B ratio is most preferably close to 1:1.

The internally emulsified PUD can be prepared according to the known processes, preferably by the "acetone process" or the "prepolymer mixing process". The general procedure is first to prepare a prepolymer or the polyurethane in an inert organic solvent and then to disperse the prepolymer or the polyurethane in water. The prepolymer can be further polymerized to the polyurethane by adding water or amine.

According to an embodiment of the present disclosure, a process for preparing the internally emulsified PUD comprises the steps of (i) reacting an monomeric isocyanate or a prepolymer of the monomeric isocyanate with polyols and cationic or anionic precursor which has at least one isocyanate-reactive groups (e.g. the above stated ionic internal emulsifier) to form a PUD prepolymer comprising pendant cationic or anionic hydrophilic groups attached to the PU chain; (ii) dispersing the PUD prepolymer into an aqueous solvent (e.g. water), with the cationic or anionic hydrophilic group attached to the PU chain as main emulsifier, optionally with the assistance of external emulsifier in this step; and optionally (iii) reacting the emulsion with additional isocyanate-reactive components comprising at least two isocyanate-reactive groups (also known as the chain extender) to form the ionic internally emulsified polyurethane dispersion.

According to one embodiment of the present disclosure, the internally emulsified PUD is applied on the release layer, and then the solvent (e.g. water) is removed therefrom, so that the PU particles dispersed in the PUD form the top coating layer. According to an alternative embodiment, the PU particles in the internally emulsified PUD may further comprise free isocyanate groups attached to the backbone chain of the PU resin, thus the PU resins in the PUD can be further crosslinked by crosslinking agents retained in the internally emulsified PUD or additionally added after the top coating layer is applied. The crosslinking agents may be selected from one or more of those used in the preparation of the internally emulsified PUD. According to one preferable embodiment, the content of the free isocyanate groups remained in the internally emulsified PUD can be up to 10% by mole, preferably up to 8% by mole, more preferably up to 5% by mole, more preferably up to 3% by mole, more preferably up to 2% by mole, more preferably up to 1% by mole, based on the total molar amounts of the isocyanate groups contained in all the raw materials for preparing the internally emulsified PUD.

Externally Emulsified Polyurethane Dispersion

The barrier coating is formed by applying an externally emulsified polyurethane dispersion on the top coating layer, followed by removing the solvent from the dispersion by e.g. thermal treatment or evaporation under decreased pressure, hence the barrier coating is basically formed by the polyurethane particles dispersed in the dispersion together with any residual nonvolatile additives. According to one embodiment of the present disclosure, the PUD may comprise particles of externally emulsified polyurethane, solvent (preferably water), colorant masterbatch and other additives.

According to one preferable embodiment, the externally emulsified polyurethane dispersion is aqueous and is basically free of any organic solvent intentionally added therein. Generally, the aqueous dispersion has at most about 1 percent by weight of organic solvent, based on the total weight of the dispersion. Preferably, the aqueous dispersion has at most about 2000 parts per million by weight (ppm), more preferably at most about 1000 ppm, even more preferably at most about 500 ppm and most preferably at most a trace amount of organic solvent.

The expression "externally emulsified polyurethane dispersion" as described herein refers to a polyurethane dispersion comprising limited amount, preferably do not comprise internally emulsifying components and thus mainly relying on the emulsifying function of "external emulsifier" (i.e. ionically or nonionically emulsifiers that are not covalently bonded to the backbone chain within the polyurethane particles dispersed in the liquid medium, especially via the urethane bond derived from the reaction between an isocyanate group and an isocyanate-reactive group (such as a hydroxyl group)) so as to stabilize the polyurethane dispersion.

According to one embodiment of the present disclose, the externally emulsified polyurethane dispersion is prepared by (i) reacting one or more monomeric or prepolymeric polyisocyanates with one or more compounds having at least two isocyanate-reactive groups as stated above to form a prepolymer comprising an urethane prepolymer chain and at least two free isocyanate groups; (ii) dispersing the prepolymer obtained in step (i) in an aqueous solvent (e.g. water) with the presence of the external emulsifier to form an emulsion; and optionally (iii) further adding one or more compounds having at least two isocyanate-reactive groups into the emulsion to react with the prepolymer obtained in step (ii) and form the externally emulsified polyurethane dispersion. According to one embodiment of the present disclosure, the prepolymer prepared in the step (i) does not comprise any ionic internal emulsifier or residual moieties of the ionic internal emulsifier covalently bonded to the urethane prepolymer chain. According to another embodiment of the present disclosure, the polyurethane chain in the prepolymer prepared in the step (i) does not comprise any cationic or anionic pendant group. According to another embodiment of the present disclosure, the polyurethane chain in the prepolymer prepared in step (i) does comprise polyethylene glycol group.

According to one embodiment of the present disclosure, the compounds having at least two isocyanate-reactive groups used in step (i) are diols, and the compounds having at least two isocyanate-reactive groups used in step (iii) are C2-C10 alkanolamine comprising at least one hydroxyl group and at least one amino groups.

In one embodiment of the present disclosure, the above stated internal emulsifier used for the preparation of the internally emulsified PUD is not added during the preparation of the externally emulsified polyurethane dispersion. In a preferable embodiment of the present disclosure, the externally emulsified polyurethane dispersion is free of any internal emulsifier and there is no anionic or cationic salt group in the backbone chain of the polyurethane particles dispersed in the externally emulsified PUD.

In one embodiment of the present application, the dry thickness of the top coating layer is from 0.01 to 500 μm, preferably from 0.01 to 150 μm, more preferably from 0.01 to 100 μm. The PU particles dispersed in the externally emulsified PUD have a particle size from 20 nm to 5,000 nm, preferably from 50 nm to 2,000 nm, and more preferably from 50 nm to 1,000 nm.

In one embodiment of the present application, the one or more second isocyanate components (Bi) comprises one or more isocyanates used for the isocyanate component (Ai), the second isocyanate-reactive components (Bii) comprise one or more of the isocyanate-reactive component used for the polyol component (Aii).

According to one embodiment of the present application, the polyurethane in the externally emulsified PUD is prepared by reacting a polyurethane/urea/thiourea prepolymer with an optional chain-extending reagent (i.e. the above stated isocyanate-reactive component used for reacting with the prepolymer) in an aqueous medium and in the presence of a stabilizing amount of an external emulsifier. The polyurethane/urea/thiourea prepolymer is derived from the one or more first isocyanate components (Ai) and the one or more first isocyanate-reactive components (Aii), and can be prepared by any suitable method such as those well known in the art. The prepolymer is advantageously prepared by contacting a high molecular weight organic compound having at least two active hydrogen atoms with sufficient amount of polyisocyanate, and under such conditions to ensure that the prepolymer is terminated with at least two isocyanate groups. The polyisocyanate is preferably an organic diisocyanate, and may be aromatic, aliphatic, or cycloaliphatic, or a combination thereof. Preferred diisocyanates include 4,4'-diisocyanatodiphenylmethane, 2,4'-diisocyanatodiphenylmethane, isophorone diisocyanate, p-phenylene diisocyanate, 2,6-toluene diisocyanate, methylene diphenyl diisocyanate, polyphenyl polymethylene polyisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, hydrogenated methylene diphenyl diisocyanate, 4,4'-diisocyanatodicyclohexylmethane, 2,4'-diisocyanatodicyclohexylmethane, and 2,4-toluene diisocyanate, or combinations thereof. More preferred diisocyanates are 4,4'-diisocyanatodicyclohexylmethane, 4,4'-diisocyanatodiphenylmethane, 2,4'-diisocyanatodi-cyclohexylmethane, and 2,4'-diisocyanatodiphenylmethane. Most diisocyanates are 4,4'-diisocyanatodiphenylmethane and 2,4'-diisocyanatodiphenylmethane.

According to one embodiment, the isocyanate-reactive components (Bii) are high molecular weight organic compound with at least two active hydrogen atoms and having a molecular weight of not less than 500 Daltons or a small molecular compound with at least two active hydrogen atoms and having a molecular weight of less than 500 Daltons. The high molecular weight organic compound having at least two active hydrogen atoms may be a polyol (e.g., diol), a polyamine (e.g., diamine), a polythiol (e.g., dithiol) or mixtures thereof (e.g., an alcohol-amine, a thiol-amine, or an alcohol-thiol). Typically the compound has a weight average molecular weight of at least about 500, preferably at least about 750 Daltons, and more preferably at least about 1000 Daltons, at most about 20,000 Daltons, more preferably at most about 15,000 Daltons, more preferably at most about 10,000 Daltons, and most preferably at most about 5,000 Daltons.

According to one embodiment, the isocyanate-reactive components (Bii) comprise polyalkylene ether glycols, polyester polyols and polycarbonate polyols. Representative examples of polyalkylene ether glycols are polyethylene ether glycols, poly-1,2-propylene ether glycols, polytetramethylene ether glycols, poly-1,2-dimethylethylene ether glycols, poly-1,2-butylene ether glycols, and polydecamethylene ether glycols. Preferred polyester polyols include adipate and succinate based polyesters such as polybutylene adipate, caprolactone based polyester polyols and aromatic polyesters such as polyethylene terephthalate. Preferred polycarbonate polyols include those derived from butanediol, hexanediol, and cyclohexanedimethanol. Preferably, in the polyurethane/urea/thiourea prepolymer, the molar ratio between the isocyanate group and the isocyanate-reactive groups (NCO:XH, where X is O, N or S), is not less than 1.1:1, more preferably not less than 1.2:1, and preferably not greater than 5:1. The polyurethane prepolymer may be prepared by a batch or a continuous process. Useful methods include methods such as those known in the art. For example, a stoichiometric excess of a diisocyanate and a polyol can be introduced in separate streams into a static or an active mixer at a temperature suitable for controlled reaction of the reagents, typically from about 40° C. to about 120° C., preferably from 70° C. to 110° C. A catalyst, such as an organotin catalyst (e.g., stannous octoate), may be used to facilitate the reaction of the reagents. The reaction is generally carried to substantial completion in a mixing tank to form the prepolymer.

The external emulsifier may be cationic, anionic, or nonionic, and is preferably anionic. Suitable classes of emulsifiers include, but are not restricted to, sulfates of ethoxylated phenols such as poly(oxy-1,2-ethanediyl)α-sulfo-ω(nonylphenoxy) salt; alkali metal fatty acid salts such as alkali metal oleates and stearates; alkali metal C12-C16alkyl sulfates such as alkali metal lauryl sulfates; amine C12-C16alkyl sulfates such as amine lauryl sulfates, more preferably triethanolamine lauryl sulfate; alkali metal C12-C16alkylbenzene sulfonates such as branched and linear sodium dodecylbenzene sulfonates; amine C12-C16alkyl benzene sulfonates such as triethanolamine dodecylbenzene sulfonate; anionic and nonionic fluorocarbon emulsifiers such as fluorinated C4-C16alkyl esters and alkali metal C4-C16perfluoroalkyl sulfonates; organosilicon emulsifiers such as modified polydimethylsiloxanes. It can be seen that these emulsifiers do not comprise any copolymerizable groups, hence no chemical reaction will occur to them and they may be termed as "non-reactive external emulsifier" or "inert external emulsifier". As disclosed herein, the externally emulsified PUD only comprises non-reactive external emulsifier, i.e. the external emulsifier used for the preparation of the externally emulsified PUD does not comprise the isocyanate groups or the isocyanate-reactive groups. According to another embodiment of the present application, the external emulsifier does not comprise any copolymerizable groups.

According to an embodiment of the present disclosure, the amount of the external emulsifier is about 0.1% to 10%, preferably 0.5% to 5% by weight, based on the total weight of the externally emulsified PUD.

Preferably, the external stabilizing emulsifier is one that can react with a multivalent cation present in a neutral salt to form an insoluble multivalent cation water insoluble salt of an organic acid. Exemplary preferred emulsifiers include disodium octadecyl sulfosuccinate, sodium dodecylbenzene sulfonate, sodium stearate and ammonium stearate. The polyurethane dispersion may be prepared by any suitable method such as those well known in the art.

When preparing the externally emulsified polyurethane dispersion, the prepolymer may be extended by water solely, or may be extended using a chain extender such as those known in the art. According to one embodiment of the present disclosure, the definition of the so called chain extender overlaps with the isocyanate-reactive components (Bii) stated above. When used, the chain extender may be an isocyanate reactive diamine or an amine compound having another isocyanate reactive group and a molecular weight of up to about 450, but is preferably selected from the group consisting of: an aminated polyether diol; piperazine, aminoethylethanolamine, ethanolamine, ethylenediamine and mixtures thereof. Preferably, the amine chain extender is dissolved in the water used to make the dispersion.

In a preferred method of preparing the externally emulsified polyurethane dispersion, a flowing stream containing the prepolymer is merged with a flowing stream containing water with sufficient shear to form the polyurethane dispersion. An amount of an external emulsifier is also present, either in the stream containing the prepolymer, in the stream containing the water, or in a separate stream. The relative rates of the stream containing the prepolymer and the stream containing the water are preferably such that the polydispersity of the emulsion (the ratio of the volume average diameter and the number average diameter of the particles or droplets, or Dv/Dn) is not greater than about 4, more preferably not greater than about 3, more preferably not greater than about 2, more preferably not greater than about 1.5, and most preferably not greater than about 1.3; or the volume average particle size is not greater than about 5 microns, more preferably not greater than about 2 micron, more preferably not greater than about 1 micron, and most preferably not greater than about 0.8 micron. The PU particles dispersed in the externally emulsified PUD have a particle size from 20 nm to 5,000 nm, preferably from 50 nm to 2,000 nm, and more preferably from 50 nm to 1,000 nm.

The external emulsifier is sometimes used as a concentrate in water. In this case, a stream containing the emulsifier is advantageously first merged with a stream containing the prepolymer to form a prepolymer/emulsifier mixture. Although the polyurethane dispersion can be prepared in this single step, it is preferred that a stream containing the prepolymer and the emulsifier be merged with a water stream to dilute the emulsifier and to create the aqueous polyurethane dispersion.

The externally emulsified PUD may have any suitable solids loading of polyurethane particles, but generally the solids loading is between about 1% to about 70% solids by weight of the total dispersion weight, preferably at least about 2%, more preferably at least about 4%, more preferably at least about 6%, more preferably at least about 15%, more preferably at least about 25%, most preferably at least about 35%, to at most about 70%, preferably at most 68%, more preferably at most about 65%, more preferably at most about 63% and most preferably at most about 60% by weight.

The externally emulsified PUD may also contain a rheological modifier such as thickeners that enhance the dispersability and stability of the dispersion. Any suitable rheological modifier may be used such as those known in the art. Preferably, the rheological modifier is one that does not cause the dispersion to become unstable. More preferably, the rheological modifier is a water soluble thickener that is not ionized. Examples of useful rheological modifiers include methyl cellulose ethers, alkali swellable thickeners (e.g., sodium or ammonium neutralized acrylic acid polymers), hydrophobically modified alkali swellable thickeners (e.g., hydrophobically modified acrylic acid copolymers) and associative thickeners (e.g., hydrophobically modified ethylene-oxide-based urethane block copolymers). Preferably the rheological modifier is a methylcellulose ether. The amount of thickener is from at least about 0.2% to about 5% by weight of the total weight of the externally emulsified PUD, preferably from about 0.5% to about 2% by weight.

Generally, the externally emulsified PUD has a viscosity from at least about 10 cp to at most about 10,000 cp, preferably, from at least about 20 cp to at most about 5000 cp, more preferably, from at least about 30 cp to at most about 3000 cp.

In an embodiment of the present disclosure, the dispersion of the PU particles in the externally emulsified PUD can be promoted by the external emulsifier and high shear stirring action (such as the BLUEWAVE technology developed by DOW Chemical), wherein the shear force and stirring speed can be properly adjusted based on specific requirement.

According to one embodiment of the present disclosure, the externally emulsified PUD may further comprise one or more pigment, dyes and/or colorant, all of which are generally termed as "color masterbatch" in the present disclosure. For example, the color masterbatch may be added so as to impart a transparent or translucent film with a desired color. Examples of pigments dyes and/or colorants may include iron oxides, titanium oxide, carbon black and mixtures thereof. The amount of the pigment, dyes and/or colorant may be 0.1% to 15%, preferably 0.5-10%, more preferably 1% to 5% by weight, based on the total weight of the externally emulsified PUD. Suitable commercially available black pigments useful in the present invention may include for example EUDERM™ black B-N carbon black dispersion available from Lanxess Deutschland GmbH.

According to one embodiment of the present disclosure, the externally emulsified PUD is applied on the release layer, and then the solvent (e.g. water) is removed therefrom, so that the PU particles dispersed in the PUD form the barrier layer. According to an alternative embodiment, the PU particles in the externally emulsified PUD may further comprise blocked isocyanate groups attached to the backbone chain of the PU resin, thus the PU resins in the PUD can further react with crosslinking agents retained in the externally emulsified PUD or additionally added as the top coating layer is being or has been applied. The crosslinking agents may be selected from one or more of those used as isocyanate-reactive component or chain extender in the preparation of the externally emulsified PUD. According to one preferable embodiment, the content of the blocked isocyanate groups remained in the externally emulsified PUD can be up to 10% by mole, preferably up to 8% by mole, more preferably up to 5% by mole, more preferably up to 3% by mole, more preferably up to 2% by mole, more preferably up to 1% by mole, based on the total molar amounts of the isocyanate groups contained in all the raw materials for preparing the externally emulsified PUD.

Two Components Non-solvent Polyurethane Foam Layer (2K non-solvent PU foam)

The 2K non-solvent PU foam of the present disclosure comprises a continuous PU matrix that defines a plurality of pores and/or cells therein. As disclosed herein, the terms "solvent free", "solventless" or "non-solvent", can be used interchangeably for describing the PU foam or any other dispersion, mixture, etc., and shall be interpreted that the mixture of all the raw materials used for preparing the PU foam or PU dispersion comprise less than 3% by weight, preferably less than 2% by weight, preferably less than 1% by weight, more preferably less than 0.5% by weight, more preferably less than 0.2% by weight, more preferably less than 0.1% by weight, more preferably less than 100 ppm by weight, more preferably less than 50 ppm by weight, more preferably less than 10 ppm by weight, more preferably less than 1 ppm by weight of any organic or inorganic solvents, based on the total weight of the mixture of raw materials. As disclosed herein, the term "solvent" refers to organic and inorganic liquids whose function is solely dissolving one or more solid, liquid or gaseous materials without incurring any chemical reaction. In other words, although some organic compounds, e.g. ethylene glycol and propylene glycol, and water, which are generally considered as "solvent" in the polymerization technology, are used in the preparation of PU foam, none of them belongs to "solvent" since they mainly function as isocyanate-reactive functional substance, chain extending agent or foaming agent, etc. by incurring chemical reactions.

According to one embodiment of the present disclosure, the polyurethane foam layer has a thickness in the range from 0.01 μm to 2,000 μm, preferably in the range from 0.05 μm to 1,000 μm, more preferably in the range from 0.1 μm to 750 μm and more preferably in the range from 0.2 μm to 600 μm.

According to one embodiment of the present disclosure, the foamed polyurethane in the polyurethane foam layer is prepared with a solvent-free polyurethane system comprising (Ci) one or more third isocyanate components, (Cii) one or more third isocyanate-reactive components, (Ciii) foaming agent, catalyst and any other additives. The isocyanate component (Ci) includes polyisocyanates and/or isocyanate prepolymers which are used for the isocyanate component (Ai). The polyisocyanates comprise aliphatic, cycloaliphatic and aromatic di- and/or polyisocyanates, and preferable exemplary polyisocyanates can be selected from the group consisting of tolylene diisocyanate (TDI), diphenylmethane diisocyanate (MDI) and mixtures of diphenylmethane diisocyanate and polyphenylene polymethylene polyisocyanates (polymeric MDI). The polyisocyanate prepolymers refer to prepolymers prepared by reacting the above indicated polyisocyanates for the isocyanate component (Ci) with compounds having at least two isocyanate-reactive hydrogen atoms. The reaction may be carried out at temperatures of about 50 to 150° C. In an embodiment of the present disclosure, the NCO content of the polyisocyanate prepolymer is in the range from 3% to 33.5% by weight, preferably in the range from 6% to 25% by weight, preferably in the range from 8% to 24% by weight and more preferably in the range from 10% to 20% by weight. A mixture comprising diphenylmethane diisocyanate and polytetrahydrofuran (PTHF), especially PTHF having a number average molecular weight in the range from 500 to 4,000, is used with particular preference as the isocyanate component (Ci). The NCO content of this mixture is preferably in the range from 8% to 22% by weight, and more preferably in the range from 10% to 20% by weight. The isocyanates or isocyanate prepolymers for the isocyanate component (Ci) may be further modified by incorporating uretidione, carbamate, isocyanurate, carbodiimide or allophanate groups therein at an amount of 1% to 20% by weight and more preferably in an amount of 2% to 10% by weight, based on the overall weight of isocyanate component (Ci).

The isocyanate-reactive components (Cii) comprise compounds having two or more isocyanate-reactive groups selected from OH groups, SH groups, NH groups, $NH_2$ groups and carbon-acid groups, for example β-diketo groups. According to one embodiment of the present application, the isocyanate-reactive components (Cii) comprise those used for (Aii). The isocyanate-reactive component (Cii) further includes polyether polyol and/or polyester polyol. The polyester polyol is typically obtained by condensation of polyfunctional alcohols having from 2 to 12 carbon atoms, preferably from 2 to 6 carbon atoms, with polyfunctional carboxylic acids having from 2 to 12 carbon atoms, examples being succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids. The polyether polyol is generally prepared by polymerization of one or more alkylene oxides selected from propylene oxide (PO) and ethylene oxide (EO), butylene oxide and tetrahydrofuran, with at least difunctional or multi-functional alcohols. The polyether polyol preferably has a number average molecular weight in the range from 100 to 10,000 g/mol, preferably in the range from 200 to 8,000 g/mol, more preferably in the range from 500 to 6,000 g/mol, more preferably in the range from 500 to 4,000 g/mol and more preferably in the range from 500 to 3,000 g/mol.

In one preferred embodiment of the present disclosure, the isocyanate components (Ci) and the isocyanate-reactive components (Cii) react with each other in the presence of a foaming/blowing agent (Ciii), and the foaming agent is used in combination with the isocyanate-reactive components. Useful foaming agents include commonly known chemically or physically reactive compounds. Physical blowing agents may be selected from one or more of a group consisting of carbon dioxide, nitrogen, noble gases, (cyclo) aliphatic hydrocarbons having from 4 to 8 carbon atoms, dialkyl ethers, esters, ketones, acetal and fluoroalkanes having from 1 to 8 carbon atoms. The chemically reactive foaming/blowing agent preferably comprises water, which is preferably contained as a constituent of the blend with the isocyanate-reactive components (Cii). The amount of the foaming agent is in the range from 0.05 to 10%, preferably in the range from 0.1 to 5%, more preferably from 0.1 to 2%, and most preferably from 0.1 to 0.5% by weight, based on the overall weight of all the raw materials used for preparing the polyurethane foam layer. The 2K polyurethane layer typically has a density of 0.2 to 1.1 kg/liter, preferably has a density of 0.3 to 0.9 kg/liter and more preferably has a density of 0.5 to 0.7 kg/liter.

In an embodiment of the present disclosure, the isocyanate components (Ci) reacts with the isocyanate-reactive components (Cii) in the presence of a catalyst selected from organotin compounds, such as tin diacetate, tin dioctoate, dibutyltin dilaurate, and/or strongly basic amines such as diazabicyclooctane, triethylamine, triethylenediamine or bis (N,N-dimethylaminoethyl) ether in an amount from 0.01% to 5% by weight, preferably from 0.05% to 4% by weight, more preferably from 0.05% to 3% by weight, based on the overall weight of all the raw materials used for preparing the polyurethane foam layer.

In an embodiment of the present disclosure, the categories and molar contents of the isocyanate components (Ci) and the isocyanate-reactive components (Cii) are particularly selected so that the overall equivalence ratio of NCO groups to NCO-reactive hydrogen atoms (e.g. hydrogen atom in the hydroxyl group) is in the range from 0.9:1 to 1.8:1, preferably from 0.92:1 to 1.6:1, preferably in the range from 0.95:1 to 1.5:1, and more preferably in the range from 1:1 to 1.45:1, more preferably in the range from 1.05:1 to 1.4:1, and more preferably in the range from 1.10:1 to 1.35:1.

Auxiliary Agents and Additives

The top coating layer, barrier layer and 2K PU foam layer may independently and optionally comprise any additional auxiliary agents and/or additives for specific purposes.

In one embodiment of the present disclosure, one or more of the auxiliary agents and/or additives may be selected from the group consisting of fillers, cell regulators, release agents, dyes/pigments, surface-active compounds, handfeeling agents, dullers, thickeners, crosslinkers and stabilizers.

Examples of suitable fillers comprise glass fibers, mineral fibers, natural fibers, such as flax, jute or sisal for example, glass flakes, silicates such as mica or glimmer, salts, such as calcium carbonate, chalk or gypsum. The fillers are typically used in an amount from 0.5% to 60% by weight and preferably from 3% to 30% by weight, based on the overall dry weight of the top coating, barrier layer or 2K PU foam layer.

Backing Substrate

In an embodiment of the present disclosure, the backing substrate has a thickness of in the range from 0.01 mm to 50 mm, preferably in the range from 0.05 mm to 10 mm and more particularly in the range from 0.1 mm to 5 mm. The backing substrate may comprise one or more selected from the group consisting of fabric, preferably woven or nonwoven fabric, impregnated fabrics, knit fabric, braid fabric, or microfiber; foil of metal or plastic, e.g. rubber, PVC or polyamides; and leather, preferably split leather.

The backing substrate can be made of a woven or nonwoven textile. Preferably, the textile is a nonwoven textile. The textile may be made by any suitable method such as those known in the art. The textile may be prepared from any suitable fibrous material. Suitable fibrous materials include, but are not limited to, synthetic fibrous materials and natural or semi synthetic fibrous materials and mixtures or blends thereof. Examples of synthetic fibrous materials include polyesters, polyamides, acrylics, polyolefins, polyvinyl chlorides, polyvinylidene chlorides, polyvinyl alcohols and blends or mixtures thereof. Examples of natural semi-synthetic fibrous materials include cotton, wool and hemp.

Manufacture Technology

The internally and externally emulsified PUD may be applied by conventional coating technologies such as spraying coating, blade coating, die coating, cast coating, etc.

The top coating and the barrier layer can be either partially or completely dried before the application of the next layer. In one embodiment of the disclosure, both the top coating and the barrier layer are completely dried so as to minimize the moisture entrapped therein, and then the next layer is applied thereon. In an alternative embodiment of the present application, only part of the moisture is removed from the top coating layer on the release layer, then the top coating is completely dried together with the barrier layer applied thereon.

According to one embodiment, the component Ci and the component Cii for the 2K non-solvent PU foam are mixed together, appled to the barrier layer, and pre-cured by being heated in an oven at a temperature of e.g. from 70° C. to 130° C., preferably from 75° C. to 100° C. for a short duration of 10 seconds to 5 minutes, preferably from 30 seconds to 2 minutes, more preferably from 45 to 90 seconds. Then the backing substrate (e.g. a textile fabric) is applied to the pre-cured 2k PU foam layer with the assistance of a pressing roller, followed by being post cured at a higher temperature of e.g. from 105° C. to 150° C., preferably from 110° C. to 140° C. for a longer duration of 2 to 20 minutes, preferably from 3 to 10 minutes, more preferably from 4 to 10 minutes. The above stated two-step curing process aims to ensure high adhesion strength between the pre-cured 2k PU foam and the backing substrate.

According to a preferable embodiment of the present disclosure, the release layer is removed after the 2k PU foam has been fully cured. The release layer can be peeled off via any ordinary technologies.

According to a preferable embodiment of the present disclosure, after the removal of the release layer, a top finishing layer can be applied onto the surface of the synthetic leather (i.e. on the outermost surface of the top coating layer) and dried to form a protection film layer.

The presence of the finishing layer can further increase abrasion resistance of the multilayer synthetic leather. The protection film layer may be formed by using any suitable raw materials and technologies. The finishing layer may optionally comprise additives such as wetting agent, cross-linking agent, binder, matting agent, hand-feel modifier, pigments and/or colorants, thickener or other additives used for the top coating layer. The synthetic leather disclosed herein can further comprise one or more than one optional additional layer such as a color layer between the skin layer and the finishing layer. Other suitable optional additional layers can be selected from a water repellent layer, UV protective layer and tactile (touch/feel) modification layer.

Figure 2:
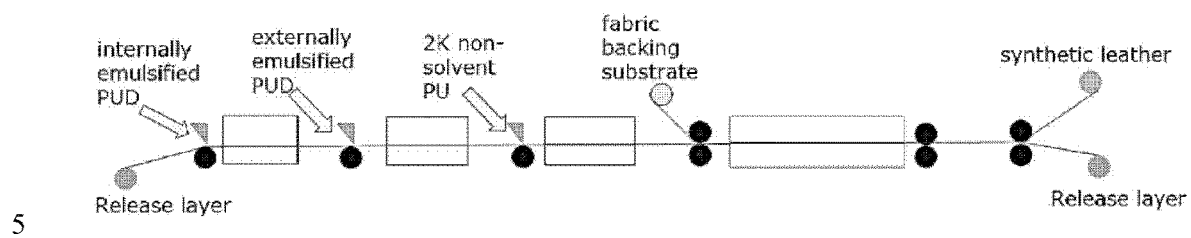
FIG. 2 is a schematic illustration of a process for preparing a synthetic leather article described herein.

The process of the present invention may be carried out continuously or batchwise. An example of the continuous process is a roll to roll process, and is schematically shown in FIG. 2. A roll of the release layer is unwound and transmitted through two or more work station where the internally emulsified PUD, the externally emulsified PUD and the two-part raw materials for the non-solvent PU foam are applied in sequence. Heating or irradiation devices may be arranged after each coating station to promote the drying or curing of the coated layers, and rollers can also be used for enhancing the adhesion strength between the layers. The unwound release layer is generally from 10 to 20,000 meters, from 10 to 15,000 meters and preferably from 20 to 10,000 meters in length and is typically transmitted at a speed in the range from 0.1 to 60 m/min, preferably from 3 to 45 m/min, more preferable from 5 to 15 m/min. In the end of the continuous technology, the release layer is peeled off and wound up on a spindle. The wound-up release layer may be reused, preferably for at least 2 times.

The backing substrate can be provided in a roll to roll mode, i.e. the backing substrate is provided as a roll, unwound and applied on the surface of the partially cured 2K non-solvent PU foam, then the 2K non-solvent PU foam is fully cured and the laminated synthetic leather article can be wound on a spindle and stored/sold as a roll.

In one preferred embodiment, the synthetic leather is oriented by being stretched in one or two directions (i.e. uniaxial or biaxial orientation). The dimension of the oriented synthetic leather may be increased by a factor of 1.1 to 5, preferably by a factor of 1.2 to 2. The oriented synthetic leather exhibits improved breathability.

The multilayer structure synthetic leather disclosed herein can be cut or otherwise shaped so as to have a shape suitable for any desired purpose, such as shoe manufacturing. Depending on the intended application, the synthetic leathers can be further treated or post-treated similarly to natural leathers, for example by brushing, filling, milling or ironing. If desired, the synthetic leathers may (like natural leather) be finished with the customary finishing compositions. This provides further possibilities for controlling their character. The multilayer structure disclosed herein may be used in various applications particularly suitable for use as synthetic leather, for example, footwear, handbags, belts, purses, garments, furniture upholstery, automotive upholstery, and gloves. The multilayer structure is particular suitable for use in automotive applications.

EXAMPLES

Some embodiments of the invention will now be described in the following Examples, wherein all parts and percentages are by weight unless otherwise specified.

The information of the raw materials used in the examples is listed in the following table 1:

TABLE 1

| Raw materials | | |
|---|---|---|
| Components | Grades | Supplier |
| Internally emulsified aliphatic polyurethane dispersion with triethyl amine carbonate side group on polymer chain, solid content 33-35 wt % | Bayderm Bottom PR | Dow Chemical |
| Internally emulsified aliphatic polyurethane dispersion with triethyl amine carbonate side group on polymer chain, solid content 38-40 wt % | Bayderm Finish 91 UD | Dow Chemical |
| Externally emulsified aromatic polyurethane dispersion with sulfonate emulsifier, solid content 53-55 wt % | Syntegra YS3000 | Dow Chemical |
| Dullers to control the gloss of the final coating film | Matt-agent SN-C | Lanxess |
| Color master batch | Euderm Black B-N | Lanxess |
| Thickener | RM 1020 | Dow Chemical |
| Polyol in 2K PU composite | See Table 2 | Dow Chemical |
| Prepolymer in 2K PU composite | Voralast* GE 143 ISO | Dow Chemical |
| Non-woven fabric | Spunlace, 6-7 mm | Xiaoshan Hangmin |
| Release paper | DE-90 | Ajinomoto |

The 2K non-solvent PU foam is prepared by combining the isocyanate prepolymer shown in table 1 and the raw materials listed in table 2.

TABLE 2

| Raw materials used in 2K PU composite | | |
|---|---|---|
| Materials | Content/% | Vendor |
| SPECFLEX NC 701 | 28 | Dow Chemical |
| VORANOL CP 6001 | 46 | Dow Chemical |
| VORANOL 4240/EP 1900 | 18 | Dow Chemical |
| Dipropylene glycol | 4 | Dow Chemical |
| Ethylene glycol | 3 | Dow Chemical |
| WATER | 0.22 | NA |
| Dbaco DC- 193 | 0.5 | Dow Chemical |
| Polycat SA2LE | 0.2 | Evonik |
| Poly cat SA-1 | 0.04 | Evonik |
| Niax C-225 | 0.02 | Evonik |
| Mixing ratio | | |
| Above substances/Voralast* GE 143 ISO | | 100/54 |

The formulations of the internally emulsified PUD (PUD coatings 1 and 3) and the externally emulsified PUD (PUD coatings 2 and 4) are summarized in table 3, wherein all the percentage are calculated by weight, based on the total weight of the resultant PUD.

TABLE 3

Formulation for internally/externally emulsified PUD coating layer

| Components | PUD Coating 1 | PUD Coating 2 | PUD Coating 3 | PUD Coating 4 |
|---|---|---|---|---|
| Bayderm Bottom PR | 70.3 | — | — | — |
| Bayderm Finish 91 UD | — | — | 70.3 | — |
| Diluted Syntegra™ YS3000 (35%) | — | 70.3 | — | 70.3 |
| Euderm Black B-N | 13.6 | 13.6 | 13.6 | 13.6 |
| RM 1020 | 0.9 | 0.9 | 1.5 | 1.5 |
| Matt-agent SN-C | 15.2 | 15.2 | 15.2 | 15.2 |

Note:
YS 3000 was diluted to 35% by water

Example 1

A synthetic leather article was prepared by using the raw materials and process conditions listed in table 4. The polyurethane dispersions for PUD coatings 1 and 2 were separately prepared by mixing the components shown in table 3 with a FlackTek speed mixer (Model #: DAC150.1 FVA) at 2500 rpm for 2.5 min. The PUD coating 1 was coated on release paper to a wet film thickness of 100 μm. The coated release paper was dried in oven at 80° C. for 5 min and at 120° C. for 10 min. Then the PUD coating 2 was coated on the PUD coating 1 to a wet film thickness of 100 μm. The coated laminate was dried in oven at 80° C. for 5 min and at 120° C. for 10 min.

The components shown in table 3 was mixed with the Voralast* GE 143 ISO shown in table 2 at a weight ratio of 100/54 by a disperser, and the mixture was applied on the surface of the dried externally emulsified PUD coating (the barrier layer) to a wet film thickness of 300 μm. The coated laminate was pre-cured in a 85° C. oven for 45 sec. A non-woven fabric backing layer was carefully applied onto the 2k PU foam film and pressed with a 3.9 kg roller for 2 times. The specimen was post-cured in a 120° C. oven for 10 min, and then taken out and cooled to ambient temperature.

Example 2

A synthetic leather article was prepared by using the raw materials and process conditions listed in table 4. The polyurethane dispersions for PUD coatings 3 and 4 were separately prepared by mixing the components shown in table 3 with a FlackTek speed mixer (Model #: DAC150.1 FVA) at 2500 rpm for 2.5 min. The PUD coating 3 was coated on release paper to a wet film thickness of 100 μm. The coated release paper was dried in oven at 80° C. for 5 min and at 120° C. for 10 min. Then the PUD coating 4 was coated on the PUD coating 3 to a wet film thickness of 100 μm. The coated laminate was dried in oven at 80° C. for 5 min and at 120° C. for 10 min.

The components shown in table 3 was mixed with the Voralast* GE 143 ISO shown in table 2 at a weight ratio of 100/54 by a disperser, and the mixture was applied on the surface of the dried externally emulsified PUD coating (the barrier layer) to a wet film thickness of 300 μm. The coated laminate was pre-cured in a 85° C. oven for 45 sec. A non-woven fabric backing layer was carefully applied onto the 2k PU foam film and pressed with a 3.9 kg roller for 2 times. The specimen was post-cured in a 120° C. oven for 10 min, and then taken out and cooled to ambient temperature.

TABLE 4

Detail information of the examples 1-2 and comparative examples 1-2

| Leather samples | Coating layer 1 | | | Coating layer 2 | | | 2K PU Coating | | Fabric Non-woven | Full curing |
|---|---|---|---|---|---|---|---|---|---|---|
| | Material | Thickness | | Material | Thickness | Drying condition | Material | Preheating | | |
| Co. Example1 | PUD Coating 1 | 150 μm (wet) | 80° C. 5 min & 120° C. 10 min | No | No | 80° C. 5 min & 120° C. 10 min | Isocyanate and polyol formulation are in Table 2 | 85° C. & 45 s | 3.9 Kg roller | 120° C. & 10 min |
| Inventive Example1 | PUD Coating 1 | 100 μm (wet) | | PUD Coating 2 | 100 μm (wet) | | | | | |
| Co. Example2 | PUD Coating 3 | 150 μm (wet) | | No | No | | | | | |
| Inventive Example2 | PUD Coating 3 | 100 μm (wet) | | PUD Coating 4 | 100 μm (wet) | | | | | |

Comparative Examples 1 and 2

Figure 3:
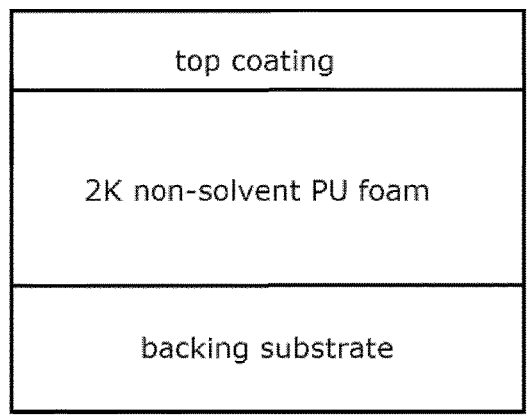
FIG. 3 is a schematic illustration of a cross-section of a synthetic leather article without a barrier layer.

Synthetic leather articles of the comparative examples have the structure shown in FIG. 3 and were prepared by using the raw materials and process conditions listed in table 4. The PUD coating 1 or 3 was coated on release paper to a wet film thickness of 150 μm. The coated release paper was dried in oven at 80° C. for 5 min and at 120° C. for 10 min. No externally emulsified PUD coating was applied.

The components shown in table 3 was mixed with the Voralast* GE 143 ISO shown in table 2 at a weight ratio of 100/54 by a disperser, and the mixture was applied on the surface of the dried internally emulsified PUD coating (the top coating layer) to a wet film thickness of 300 μm. The coated laminate was pre-cured in a 85° C. oven for 45 sec. A non-woven fabric backing layer was carefully applied onto the 2k PU foam film and pressed with a 3.9 kg roller for 2 times. The specimen was post-cured in a 120° C. oven for 10 min, and then taken out and cooled to ambient temperature.

Characterization of the Peel Strength

The release paper was removed from the leather specimens prepared in the above indicated inventive and comparative examples. Each of the leather specimens was cut into a dimension of 20 cm×3 cm, and coated with epoxy glue on the outmost surface of the top coating layer. Then it was folded with the epoxy coated surface facing together to form a 10 cm×3 cm specimen. It was pressed, and cured at room temperature overnight. Then T-model peel strength test was conducted on Instron tensile machine. Force to peel apart two faces was recorded. Three specimens were tested for each inventive or comparative examples, peel force was recorded and summarized in Table 5.

TABLE 5

Peel strength performance

| | Co. Example 1 | Co. Example 2 | Example 1 | Example 2 |
|---|---|---|---|---|
| Peel strength N/(3 cm) | 24 ± 5 | 18 ± 9 | 113 ± 13 | 75 ± 5 |

The comparison between the inventive examples and the comparative examples clearly illustrates that the adhesion strength between the top coating and the non-solvent PU foam can be significantly enhanced by disposing the externally emulsified PUD-derived coating therebetween.

What is claimed is:

1. A synthetic leather article, comprising, from top to bottom:
    (A) a top coating layer derived from an internally emulsified polyurethane dispersion comprising a first polyurethane derived from (Ai) one or more first isocyanate components comprising at least two isocyanate groups, (Aii) one or more first isocyanate-reactive components comprising at least two isocyanate-reactive groups, and (Aiii) one or more internal emulsifiers, wherein the internal emulsifiers or residual moieties of the internal emulsifiers are covalently attached to a backbone chain of the first polyurethane;
    (B) a barrier layer derived from an externally emulsified polyurethane dispersion, wherein the externally emulsified polyurethane dispersion comprising one or more external emulsifiers and a second polyurethane derived from (Bi) one or more second isocyanate components comprising at least two isocyanate groups and (Bii) one or more second isocyanate-reactive components comprising at least two isocyanate-reactive groups, wherein the external emulsifiers or residual moieties of the external emulsifiers are not covalently attached to a backbone chain of the second polyurethane;
    (C) a polyurethane foam layer comprising a third foamed polyurethane derived from a solvent-free system comprising (Ci) one or more third isocyanate components comprising at least two isocyanate groups, (Cii) one or more third isocyanate-reactive components comprising at least two isocyanate-reactive groups, and (Ciii) one or more foaming agents; and
    (D) a backing substrate.

2. The synthetic leather article according to claim 1, wherein the second polyurethane does not comprise cationic or anionic hydrophilic pendant group or a group which can be converted into the cationic or anionic hydrophilic pendant group covalently attached to the backbone chain of the second polyurethane.

3. The synthetic leather article according to claim 1, wherein the first isocyanate components (Ai), the second isocyanate components (Bi) and the third isocyanate components (Ci) are independently select from the group consisting of:
    a) C4-C12 aliphatic polyisocyanates comprising at least two isocyanate groups, C6-C15 cycloaliphatic or aromatic polyisocyanates comprising at least two isocyanate groups, C7-C15 araliphatic polyisocyanates comprising at least two isocyanate groups, and combinations thereof; and
    b) an isocyanate prepolymer prepared by reacting one or more polyisocyanates of a) with one or more isocyanate-reactive components selected from the group consisting of C2-C16 aliphatic polyhydric alcohols comprising at least two hydroxy groups, C6-C15 cycloaliphatic or aromatic polyhydric alcohols comprising at least two hydroxy groups, C7-C15 araliphatic polyhydric alcohols comprising at least two hydroxy groups, polyester polyols having a molecular weight from 500 to 5,000, polycarbonate diols having a molecular weight from 200 to 5,000, polyetherdiols having a molecular weight from 200 to 5,000, C2 to C10 polyamine comprising at least two amino groups, C2 to C10 polythiol comprising at least two thiol groups, C2-C10 alkanolamine comprising at least one hydroxyl group and at least one amino groups, and combinations thereof, with the proviso that the isocyanate prepolymer comprise at least two free isocyanate groups; and the first isocyanate-reactive component (Aii), the second isocyanate-reactive component (Bii) and the third isocyanate-reactive components(Cii) are independently selected from the group consisting of: C2-C16 aliphatic polyhydric alcohols comprising at least two hydroxy groups, C6-C15 cycloaliphatic or aromatic polyhydric alcohols comprising at least two hydroxy groups, C7-C15 araliphatic polyhydric alcohols comprising at least two hydroxy groups, polyester polyols having a molecular weight from 500 to 5,000, polycarbonate diols having a molecular weight from 200 to 5,000, polyetherdiols having a molecular weight from 200 to 5,000, C2 to C10 polyamine comprising at least two amino groups, C2 to C10 polythiol comprising at least two thiol groups, C2-C10 alkanolamine comprising at least one hydroxyl group and at least one amino groups, and combinations thereof.

4. The synthetic leather article according to claim 1, wherein the external emulsifier is selected from the group consisting of poly(oxy-1,2-ethanediyl)α-sulfo-ω(nonylphenoxy) salt; alkali metal oleates and stearates; alkali metal C12-C16alkyl sulfates; amine C12-C16alkyl sulfates; alkali metal C12-C16alkylbenzene sulfonates; amine C12-C16alkyl benzene sulfonates; fluorinated C4-C16alkyl esters and alkali metal C4-C16perfluoroalkyl sulfonates; organosilicon emulsifiers; and combinations thereof.

5. The synthetic leather article according to claim 1, wherein the solvent-free system further comprises a catalyst selected from the group consisting of organotin compounds and strongly basic amines, and the foaming agent (Ciii) is water.

6. A method for producing the synthetic leather article according to claim 1, comprising:
    (1) providing the internally emulsified polyurethane dispersion comprising particles of the first polyurethane and applying the internally emulsified polyurethane dispersion onto a release layer so as to form the top coating layer on the release layer;
    (2) providing the externally emulsified polyurethane dispersion comprising particles of the second polyurethane and applying the externally emulsified polyurethane dispersion onto an opposite side of the top coating layer from the release layer so as to form the barrier layer on the top coating layer;
    (3) applying the solvent-free system onto an opposite side of the barrier layer from the top coating, curing and foaming the solvent-free system to form the polyurethane foam layer on the barrier layer;

(4) applying the backing substrate onto an opposite side of the polyurethane foam layer from the barrier layer.

7. The method according to claim 6, wherein in step (3), the solvent-free system is cured by a pre-curing sub-step occurred before step (4) and a post-curing sub-step occurred after step (4), the pre-curing sub-step comprises heating the solvent-free system at a first temperature to partially cure solvent-free system, and the post-curing sub-step comprises heating the solvent-free system at a second heating temperature higher than the first heating temperature to completely cure solvent-free system.

8. The method according to claim 6, wherein the externally emulsified polyurethane dispersion is prepared by the steps of:
(i) reacting one or more compounds comprising at least two isocyanate groups or a first prepolymer of the compound with first isocyanate-reactive components comprising at least two hydroxyl groups to produce a second prepolymer comprising two or more free isocyanate groups and having no cationic or anionic hydrophilic pendant group or a group which can be converted into the cationic or anionic hydrophilic pendant group covalently attached to the second prepolymer;
(ii) dispersing the second prepolymer obtained in step (i) in water with the presence of one or more external emulsifiers to form an emulsion; and
optionally (iii) adding one or more isocyanate-reactive components comprising at least two isocyanate-reactive groups into the emulsion obtained in step (ii) and reacting them with the second prepolymer to produce the externally emulsified polyurethane dispersion.

9. The method according to claim 6, wherein the externally emulsified polyurethane dispersion is prepared by the steps of:
(i) reacting one or more polyisocyanates selected from the group consisting of C4-C12 aliphatic polyisocyanates comprising at least two isocyanate groups, C6-C15 cycloaliphatic or aromatic polyisocyanates comprising at least two isocyanate groups, C7-C15 araliphatic polyisocyanates comprising at least two isocyanate groups, and combinations thereof, or a first prepolymer derived from the polyisocyanates, with one or more isocyanate-reactive components selected from the group consisting of C2-C16 aliphatic polyhydric alcohols comprising at least two hydroxy groups, C6-C15 cycloaliphatic or aromatic polyhydric alcohols comprising at least two hydroxy groups, C7-C15 araliphatic polyhydric alcohols comprising at least two hydroxy groups, polyester polyols having a molecular weight from 500 to 5,000, polycarbonate diols having a molecular weight from 200 to 5,000 and polyetherdiols having a molecular weight from 200 to 5,000, to form a second prepolymer comprising two or more free isocyanate groups and having no cationic or anionic hydrophilic pendant group or a group which can be converted into the cationic or anionic hydrophilic pendant group covalently attached to the second prepolymer;
(ii) dispersing the second prepolymer obtained in step (i) in water with the presence of the external emulsifier to form an emulsion; and
optionally (iii) adding one or more isocyanate-reactive components selected from the group consisting of C2 to C10 polyamine comprising at least two amino groups, C2 to C10 polythiol comprising at least two thiol groups, C2-C10 alkanolamine comprising at least one hydroxyl group and at least one amino groups, and a combination thereof, into the emulsion obtained in step (ii) and reacting them with the second prepolymer to produce the externally emulsified dispersion.

10. The method according to claim 6, wherein the internally emulsified dispersion is prepared by the steps of:
(i) reacting one or more monomeric isocyanate compounds comprising at least two isocyanate groups or a first prepolymer of the monomeric isocyanate compounds with one or more isocyanate-reactive components comprising at least two isocyanate-ractive groups and the one or more internal surfactants to form a second prepolymer comprising pendant cationic or anionic hydrophilic groups attached to the backbone chain thereof;
(ii) dispersing the second prepolymer into water without the assistance of external emulsifier; and
(iii) adding one or more isocyanate-reactive components comprising at least two isocyanate-reactive groups into the emulsion obtained in step (ii) and reacting them with the second prepolymer to produce the internally emulsified polyurethane dispersion.

11. The synthetic leather article according to claim 1, wherein the barrier layer is in direct contact with the top coating layer and the polyurethane foam layer.

* * * * *